Aug. 2, 1927.

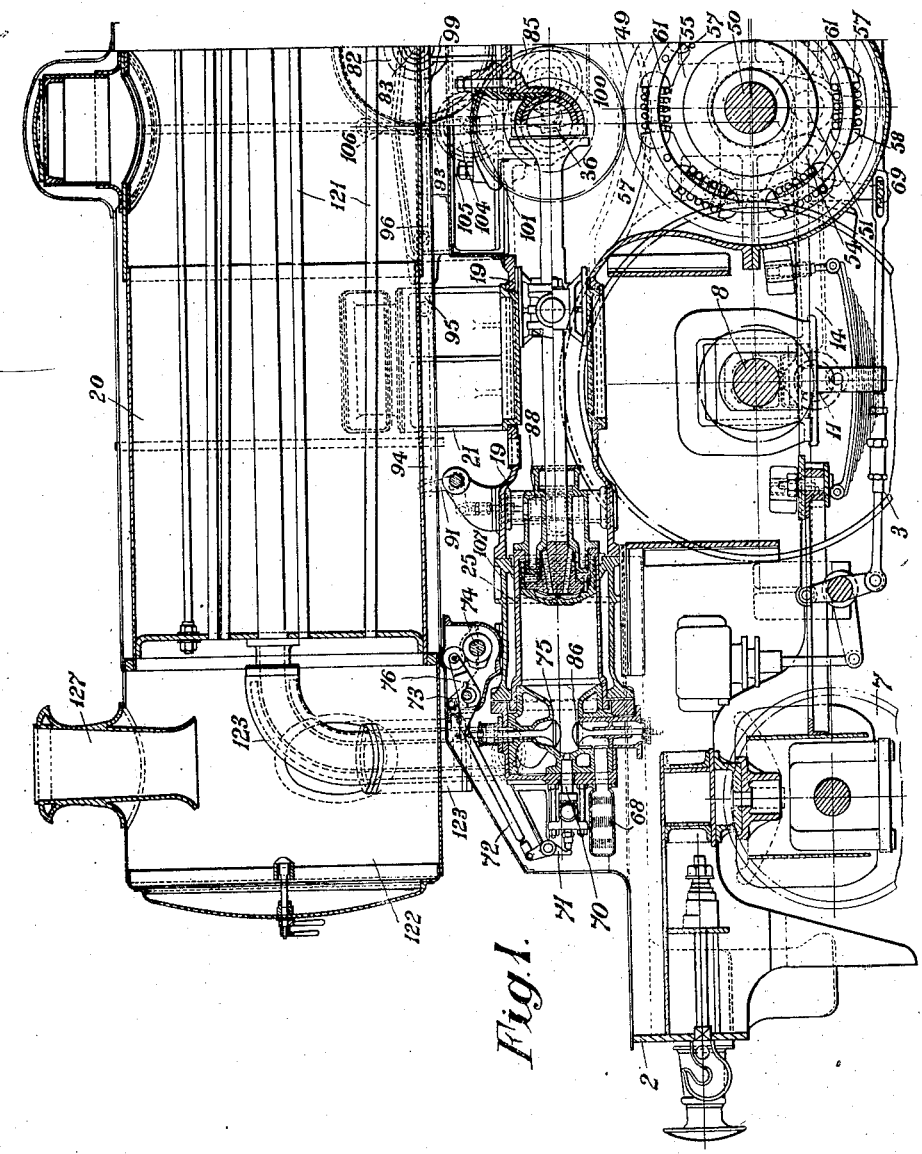

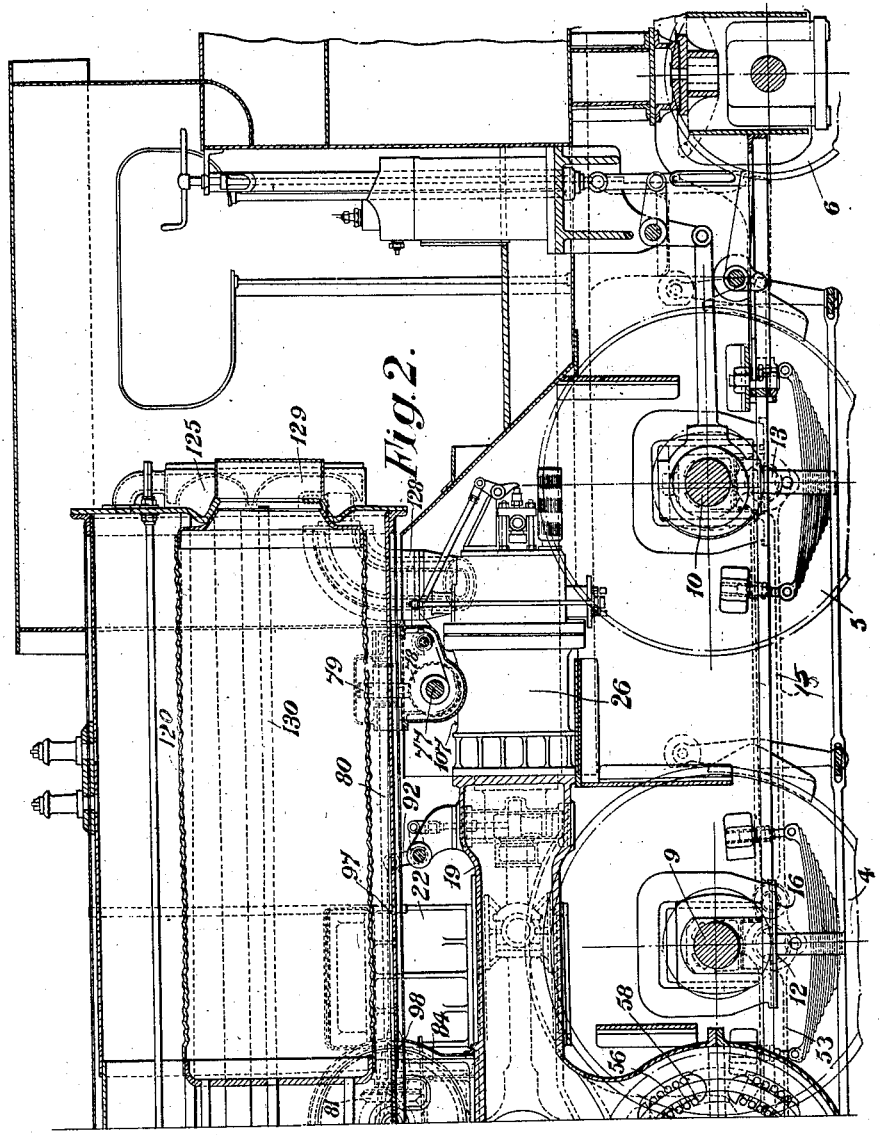

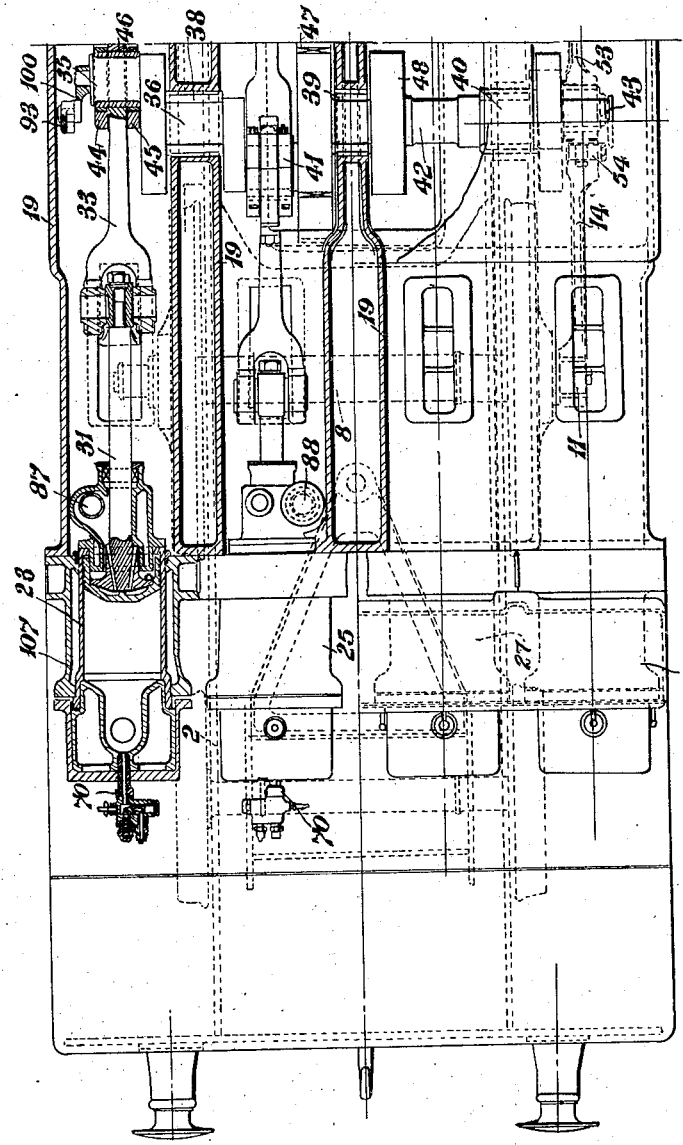

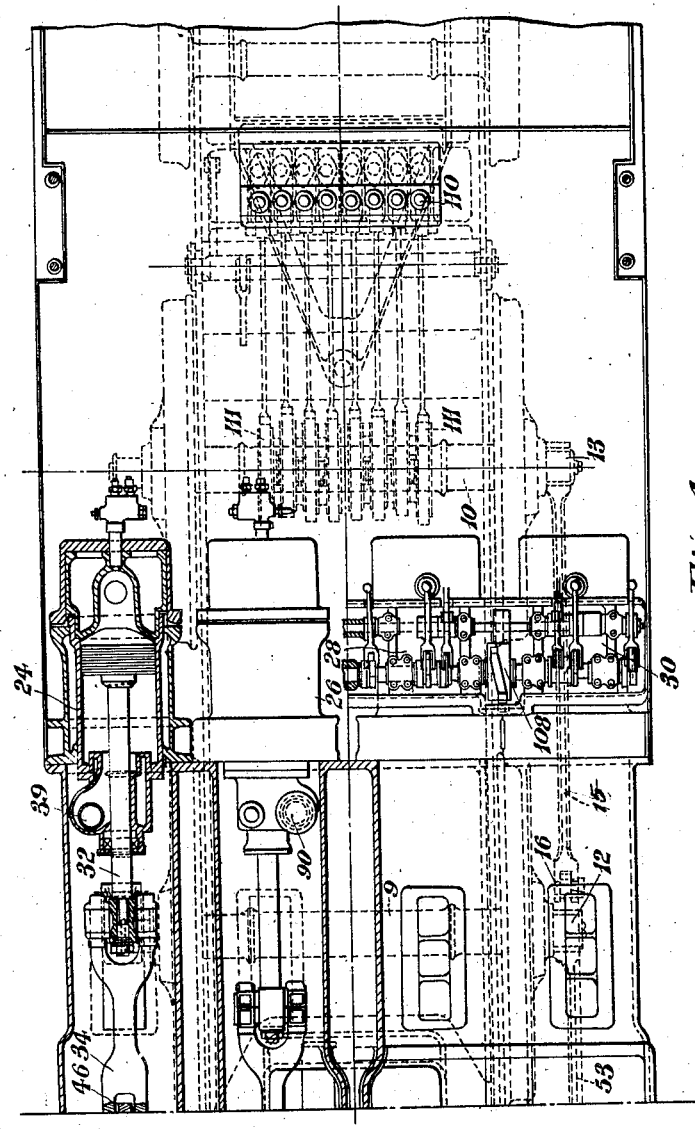

O. MARGETSON ET AL 1,637,952

LOCOMOTIVE

Filed March 26, 1923     6 Sheets-Sheet 5

Inventors-
Oliver Margetson and
Percy Grierson Robinson
By B. Singer Atty.

Patented Aug. 2, 1927.

1,637,952

UNITED STATES PATENT OFFICE.

OLIVER MARGETSON AND PERCY GRIERSON ROBINSON, OF LONDON, ENGLAND.

LOCOMOTIVE.

Application filed March 26, 1923, Serial No. 627,849, and in Great Britain April 13, 1922.

This invention relates to locomotives and has reference to locomotives adapted to be driven by internal combustion engines and particularly that type of engine, generally known as the "Still engine", where steam is used expansively at the outer sides of the combustion engine pistons.

The invention consists broadly of an internal combustion engine locomotive having a crank shaft geared to an intermediate shaft having cranks transmitting power through coupling rods to the cranks of a pair of main road or driving wheels.

A further feature of the invention comprises an internal combustion engine locomotive having two or more pairs of driving wheels with parallel cranks connected by coupling rods, wherein the crank shaft of the engine drives through gearing to an intermediate shaft having cranks arranged to transmit power to the road wheels through their coupling rods.

A further feature of the invention comprises a locomotive comprising an internal combustion engine having a number of oppositely disposed cylinders of which the pistons are arranged to drive a common crank shaft provided with a spur pinion adapted to drive a spur wheel preferably disposed centrally on an intermediate shaft provided with cranks connected by links or coupling rods to the cranks of the main road wheels.

In the preferred construction the internal combustion engine is of the type using steam on the outer side of the piston, and the steam valves are controlled by a reversing gear from the cab of the locomotive. When steam is so used a locomotive boiler of the ordinary type is used for its generation, and this boiler may be fired by liquid fuel burners for starting up and overload purposes, and during normal running it may be heated by the products of combustion from the internal combustion engines. The steam cylinders may however, be independent of the internal combustion engine.

The driving engine may consist of a number of pairs of oppositely disposed horizontal cylinders provided with steam valves operated from the outer end of a lever having a fulcrum between its ends mounted in a slide movable in a guide way of which the angle can be varied to reverse the engine, the other end of the lever being oscillated by a crank or eccentric driven from the engine crank shaft.

An embodiment of the invention using combined steam and internal combustion engines is illustrated by the accompanying drawings wherein:—

Figures 1 and 2 are together a longitudinal sectional elevation of the locomotive.

Figures 3 and 4 are together a partly sectional plan of the locomotive.

Figure 6:
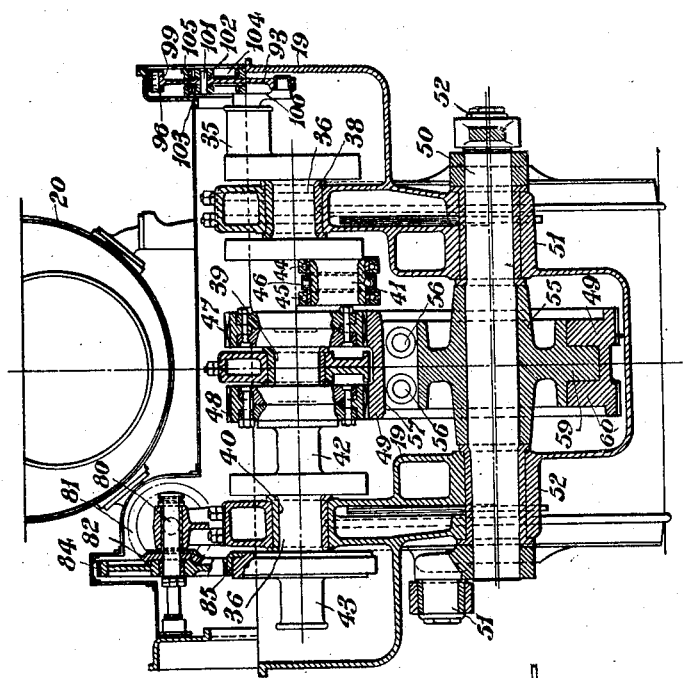
Figure 5:
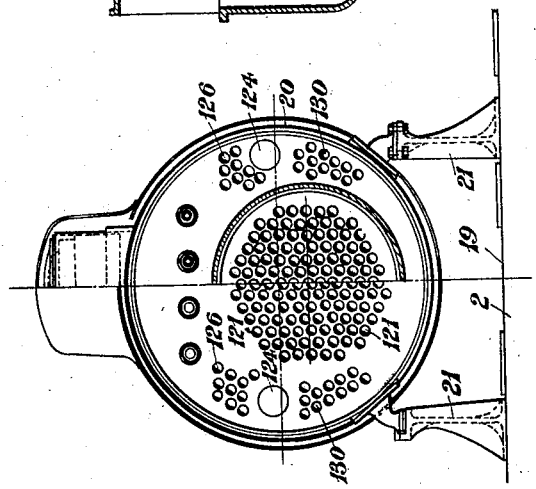
Figure 5 is a transverse sectional view of the boiler.

Figure 6 a sectional end view of the main driving shafts.

Figure 7:
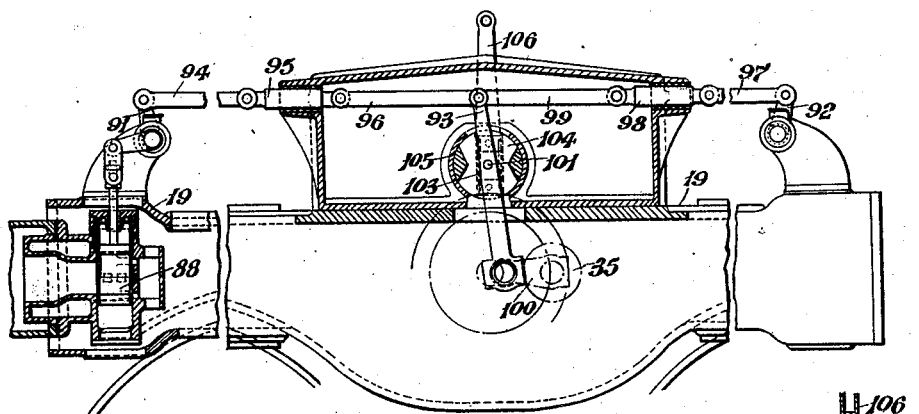
Figure 9:
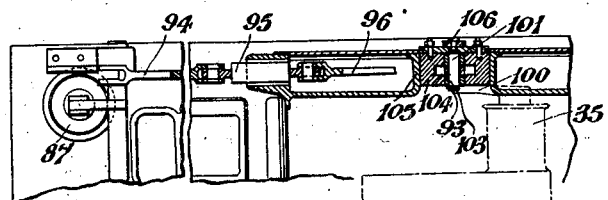

Figures 7, 8 and 9 are partly sectional side and end views and plan, respectively, of the steam valve gear on an enlarged scale.

Figure 10:
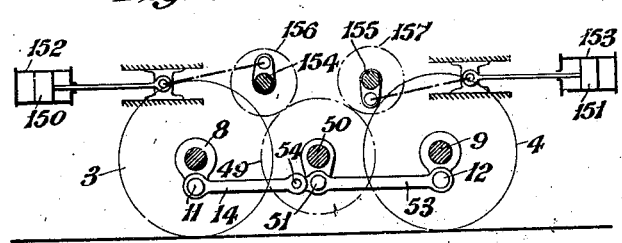

Figure 10 is a diagrammatic view illustrating a modification in which the prime mover has two crank shafts.

In these drawings 2 is the underframe of the locomotive on which are mounted in the usual manner on springs, three pairs of driving wheels 3, 4 and 5, one pair of trailer wheels 6 and a pair of pony wheels 7, the axles 8, 9 and 10 of the driving wheels on each side of the locomotive being coupled by coupling rods forming bearings on the crank pins 11, 12 and 13, and consisting of three portions 14, 53 and 15 linked together by pins 16 and 54 in the usual manner.

The brake gear, axle boxes, draw bars and buffers are of the usual construction.

The main casting forming the crank case and bed plate 19 of the engine is mounted on the frame 2 and forms also a bed plate for the boiler 20 which is supported thereon by brackets 21 and 22.

The cylinders of the engine are arranged as four oppositely disposed pairs 23—24, 25—26, 27—28 and 29—30, bolted on the ends of the bed plate 19. The pistons 31 and 32 of the oppositely disposed pair of cylinders 23—24 are connected by connecting rods 33 and 34 to a crank 35 on a crank shaft 36 mounted in bearings 38, 39 and 40 on the main engine bed plate 19, the pistons of each of the other pairs of cylinders being similarly connected by connecting rods to cranks 41, 42 and 43 on the crank shaft 36.

The ends of each of the oppositely disposed pairs of connecting rods are connected in the same manner to their crank pins; as illustrated by those on the crank pins 35 the end of the connecting rod 34 is forked and between the members 44 and 45 of the fork is arranged the end 46 of the connecting rod 33.

On either side of the central bearing 39 of the crank shaft 36 are mounted spur pinions 47 and 48 which gear with the teeth of a spur wheel 49 mounted on the centre of an intermediate shaft 50 mounted in bearings 51 and 52 depending from the engine bed plate 19.

The intermediate shaft 50 is provided at its ends with cranks 51 and 52, the axis of the shaft 50 being arranged in or near the plane of the axis of the driving wheels 3, 4 and 5. The cranks 51 and 52 extend into bearings in the central section 53 of the coupling rod on either side of the underframe so that all the cranks in the coupling rod may move parallel to each other.

The upper portion of the gear case is cast in one with the crank case and engine bed plate 19, and is provided with the necessary facings for bolting it to the underframe of the locomotive. The lower portion 69 of the intermediate shaft casing is bolted to its upper portion which forms an extension of the bed plate 19.

The central spur wheel 49 is divided into an inner part 55 secured to the intermediate shaft 50 and an outer toothed rim part 49 relatively rotatable to the inner part to a limited degree, the power being transmitted from one to the other through a number of tangential springs 56. In the example shown there are six pairs of such springs, each pair being arranged between a pair of transverse bearing bars 57 and 58 one of which is adapted to engage projections of the outer toothed portion 49 while the other engages a projection on the inner portion 55 of the spur wheel in such a manner as to transmit power from the teeth of the spur wheel to the intermediate shaft 50. The tangential springs 56 are of such a length that when in place they will be initially loaded, so that they will yield only after a given torque is reached. The spring engaging surfaces of the bearing bars 57 and 58 are flat while their opposite or rear surfaces are formed as half round bearing faces fitting in corresponding bearing recesses in radial members 59 and 60 formed in the adjacent portions of the inner and outer members 55 and 49 of the spur wheel, the projections 60 being arranged as two parallel sets projecting inwards from the wheel rim 49 so as to form between them a recess in which move circumferentially the outwardly extending projections 59 formed on the central portion of the spur wheel, the bearing bars 57 and 58 being arranged to extend across both sets of projections, and are held in place by a pair of bolted retaining rings 61 fixed against opposite sides of the wheel.

The internal combustion ends of the cylinders are of the four stroke type arranged behind the pistons, while the steam ends are arranged on the front of the pistons as in the well known type of "Still engine".

The fuel injection valve 70 of each cylinder at the front end of the locomotive, is operated by a tappet rock lever 71, link rod 72, and rock lever 73 operated from the cam shaft 74, while the main exhaust valve 75 is operated from the cam shaft by a tappet lever 76 in the usual manner, the inlet valve 86 being of the usual type and supplied with an air filter 68. The valve mechanism is duplicated for the cylinders at the other end of the engine and is driven from a similar cam shaft 77. The mechanism for driving the cam shaft 74 is not shown in the drawings; it is similar to that shown for driving the cam shaft 77 which is driven by screw gears 78 and 79, the latter being mounted on a shaft 80 driven by bevel gears 81, 82 from a shaft 83 driven by spur wheels 84, 85 from the crank 36.

The fuel injection pumps 110 are mounted on the locomotive framing and are driven from eccentrics 111 mounted on the driving wheel shaft 10, although they may however, be arranged at any other convenient part of the locomotive and be driven in any suitable manner.

The cam shaft bearings are supported on the cylinder jackets 107, one set of cams being provided for each direction of running and reversing effected by bringing the other set of cams into operation by the lateral movement of the cam shaft by means of a scroll cam 108 operated by hand mechanism from the cab. The shafts of the rocking levers 76 are eccentrically mounted in their bearings so that an angular movement of them will raise the rollers off their cams, the mechanism for effecting such movement being operated simultaneously with that operating the scroll cam 108.

On the steam side of the engine the valve of each cylinder is of the sliding cylindrical type arranged vertically in the cylinder cover, four of these valves 87, 88, 89 and 90 being shown in the plan views. The rods of the steam valves are operated by bell crank rocking levers, those for the oppositely disposed pair of cylinders 25 and 26 being shown at 91 and 92. The bell crank levers which may be formed of separate arms fixed at an angle to each other, are rocked from the rocking lever 93 of the valve gear, being connected to its upper portion at opposite sides thereof respectively by links and sliding rods; thus the bell crank lever 91 is connected by means of a link 94 to one end of a sliding rod 95, the other end of the sliding rod being connected by link 96 to the top end of the rocking lever 93 to which the bell crank lever 92 is also connected in a similar manner by the links 97 and 99 connected together by the sliding rod 98.

The lower end of the rocking lever 93 has a bearing mounted on the pin of a fly crank 100 of which the inner end is secured to the end of the crank pin 35. The rocking lever 93 has a fulcrum pin 101 the ends of which are mounted in slide blocks 102 and 103 which slide in grooves arranged diametrically in a circular angularly adjustable block 104 mounted in a bearing 105 secured to or formed in the engine bed 19. The adjustable block 104 is provided with an operating lever 106 the end of which is connected by link mechanism not shown, to an operating handle in the cab of the locomotive. This valve mechanism operates in a similar manner to the Hackworth valve gear, that is, the reversing of the engine can be effected by moving the lever 106 to incline the path of the fulcrum of the valve lever 93 to the left or right of its vertical position.

The fly crank mechanism of the steam valve gear is duplicated on the opposite side of the locomotive, the mechanism on each being arranged to operate four steam valves.

The boiler 20 is provided with a circular fire box 120 suitable for use with liquid fuel burning apparatus, and having tubes 121 leading from its back end to the smoke box 122. The exhaust from the internal combustion engines at the front of the locomotive passes through the jacketed tubes 123 to the fire tubes 124 which passes through the full length of the boiler to jacketed return boxes 125 which return the gases through groups of pipes 126 extending through the boiler and opening into the smoke box 122 from which they pass through the chimney 127. The exhaust from the internal combustion engines at the other end of the locomotive passes through the jacketed tubes 128, return boxes 129 and group of tubes 130 to the box 122.

The exhaust from the steam end of the cylinders is conveyed by suitable pipes to the smoke box in the usual manner.

The locomotive is started by admitting steam from the boiler to the steam ends of the cylinders, admission being controlled by the steam piston valve gear and the steam generated in the boiler by means of liquid fuel burners. After the locomotive has been started liquid fuel is admitted to the internal combustion engines and the liquid fuel burners of the boiler are turned down to a pilot jet only, the steam then used being that generated by the products of combustion of the internal combustion ends of the cylinders assisted by the heating of the water by jacket circulation. In the event of a demand for increased tractive effort, beyond that exerted under normal running conditions, this may be supplied by turning on the liquid fuel burner in the fire box, so as to increase the supply of steam to the full generating capacity of the boiler.

In the above example the disposition of the steam valve ports relatively to valve casing is reversed on adjacent cylinders such as 24 and 26 or 27 and 29 which have their cranks at 180° apart. This arrangement enables the steam valves of such adjacent cylinders to be operated from the same rock shaft.

In the modification illustrated diagrammatically in Figure 10 the pistons 150, 151 of the oppositely disposed sets of cylinders 152 and 153 of the internal combustion engines drive separate shafts 154 and 155 each of which is geared by pinions 156 and 157 to the gear wheel 49 on the intermediate shaft 50 which is connected to the driving wheels 3 and 4 through the coupling rods 14 and 53 as described above.

What we claim and desire to secure by Letters Patent is:—

1. An internal combustion locomotive comprising a plurality of oppositely disposed horizontal internal combustion engines and a plurality of oppositely disposed horizontal steam engines operating on a common crank shaft geared to an intermediate crank shaft, a plurality of pairs of road wheels having crank pins connected by common coupling rods, the internal combustion engines and the steam engines being arranged as pairs having a common piston rod, and the crank pins on the intermediate shaft operating directly in the coupling rods of the road wheels.

2. An internal combustion locomotive comprising a plurality of oppositely disposed horizontal internal combustion engines and a plurality of oppositely disposed horizontal steam engines operating on a common crank shaft geared to an intermediate crank shaft, a plurality of pairs of road wheels having crank pins connected by common coupling rods, the internal combustion engines and the steam engines being single acting pairs formed at opposite ends of the same cylinders on common piston rods, and the crank pins on the intermediate shaft operating directly in the coupling rods of the road wheels.

3. An internal combustion locomotive having a plurality of pairs of road wheels connected by common coupling rods and comprising a plurality of oppositely disposed horizontal internal combustion and steam engines operating on a common crank shaft geared to an intermediate crank shaft, a horizontal tubular boiler having flue tubes and return flue tubes discharging into the smoke box of the boiler, the exhaust from one set of the oppositely disposed internal combustion engines discharging into the fire box of the boiler while the exhaust from the oppositely disposed set of internal combustion engines discharges through the smoke box into the return tubes and the steam from the boiler passes to the steam engines which also operate the main crank shaft while the crank pins in the intermediate shaft operate directly in the coupling rods of the road wheels.

4. An internal combustion locomotive having a plurality of pairs of road wheels connected by common coupling rods and comprising a plurality of oppositely disposed horizontal combined internal combustion and steam engines operating on a common crank shaft geared to an intermediate crank shaft having crank pins operating directly in the road wheel coupling rods, a locomotive boiler having fire tubes and return flue tubes, the exhaust from one set of the oppositely disposed internal combustion engines discharging into the fire box of the boiler while the exhaust from the opposite set of internal combustion engines discharges through the smoke box into the return flue tubes of the locomotive boiler and the steam from the boiler passes to the steam engines.

5. An internal combustion locomotive comprising a plurality of oppositely disposed horizontal internal combustion engines operating on a common crank shaft geared to an intermediate crank shaft, a plurality of pairs of road wheels having crank pins connected by common coupling rods, the two adjacent outer pairs of the engines on either side of the locomotive having their cranks at 180° apart while the two adjacent central pairs of engines have their cranks at 90° apart, the engines operating on the main crank shaft, and the crank pins on the intermediate shaft operating directly in the coupling rods of the road wheels.

6. An internal combustion locomotive having a plurality of pairs of road wheels connected by common coupling rods and comprising a plurality of oppositely disposed water jacketed horizontal combined internal combustion and steam engines operating on a common crank shaft geared to an intermediate crank shaft having crank pins operating directly in the road wheel coupling rods, a locomotive boiler having fire tubes and return flue tubes, connected to the engines by water jacketed pipes, the exhaust from one set of the oppositely disposed internal combustion engines discharging into the fire box of the boiler, while the exhaust from the opposite set of internal combustion engines discharges through the smoke box into the return flue tubes of the locomotive boiler and the steam from the boiler passes to the steam engines, and the water space of the water jacketed connecting pipes is in communication with both the water jackets of the engines and the water space of the boiler.

7. An internal combustion locomotive having a plurality of pairs of road wheels connected by common coupling rods and comprising a plurality of oppositely disposed horizontal combined internal combustion and steam engines having a common valve operating shaft operating on a common crank shaft geared to an intermediate crank shaft having crank pins operating directly in the road wheel coupling rods, a locomotive boiler, the cylinders of the two adjacent outer pairs of the engines having their cranks at 180° apart while the two adjacent central pairs have their cranks at 90° apart and the relative position of the steam valve ports to the valves of the cylinders receiving steam from the boilers, reversed so that the valves can be operated from the common valve operating shaft, the boiler receiving at opposite ends exhaust gases from the opposite sets respectively of internal combustion engines.

8. An internal combustion locomotive comprising a plurality of oppositely disposed horizontal internal combustion engines operating on a common crank shaft geared to an intermediate crank shaft, a plurality of pairs of road wheels having crank pins connected by common coupling rods, the engines operating on the main crank shaft, which is geared centrally to the intermediate shaft, and the crank pins on the intermediate shaft operating directly in the coupling rods of the road wheels.

9. An internal combustion locomotive comprising a plurality of oppositely disposed horizontal internal combustion engines and a plurality of oppositely disposed horizontal steam engines geared to an intermediate crank shaft, a plurality of pairs of road wheels having crank pins connected by common coupling rods, the internal combustion engines and the steam engines being arranged as pairs having a common piston rod, and the crank pins on the intermediate shaft operating directly in the coupling rods of the road wheels.

10. An internal combustion locomotive comprising a plurality of oppositely disposed horizontal internal combustion engines and a plurality of oppositely disposed horizontal steam engines geared to an intermediate crank shaft, a plurality of pairs of road wheels having crank pins connected by common coupling rods, the internal combustion engines and the steam engines being single acting pairs formed at opposite ends of the same cylinders on common piston rods, and the crank pins on the intermediate shaft operating directly in the coupling rods of the road wheels.

11. An internal combustion locomotive having a plurality of pairs of road wheels connected by common coupling rods and comprising a plurality of oppositely disposed horizontal internal combustion and steam engines geared to an intermediate crank shaft, a horizontal tubular boiler having flue tubes and return flue tubes discharging into the smoke box of the boiler, the exhaust from one set of the oppositely disposed internal combustion engines discharging into the fire box of the boiler while the exhaust from the oppositely disposed set of internal combustion engines discharges through the smoke box into the return tubes and the steam from the boiler passes to the steam engine while the crank pins in the intermediate shaft operate directly in the coupling rods of the road wheels.

12. An internal combustion locomotive having a plurality of pairs of road wheels connected by common coupling rods and comprising a plurality of oppositely disposed horizontal combined internal combustion and steam engines geared to an intermediate crank shaft having crank pins operating directly in the road wheel coupling rods, a locomotive boiler having fire tubes and return flue tubes, the exhaust from one set of the oppositely disposed internal combustion engines discharging into the fire box of the boiler while the exhaust from the opposite set of internal combustion engines discharges through the smoke box into the return flue tubes of the locomotive boiler and the steam from the boiler passes to the steam engines.

13. An internal combustion locomotive comprising a plurality of oppositely disposed horizontal internal combustion engines geared to an intermediate crank shaft, a plurality of pairs of road wheels having crank pins connected by common coupling rods, the two adjacent outer pairs of the engines on either side of the locomotive having their cranks at 180° apart while the two adjacent central pairs of engines have their cranks at 90° apart, the crank pins on the intermediate shaft operating directly in the coupling rods of the road wheels.

14. An internal combustion locomotive having a plurality of pairs of road wheels connected by common coupling rods and comprising a plurality of oppositely disposed water jacketed horizontal combined internal combustion and steam engines geared to an intermediate crank shaft having crank pins operating directly in the road wheel coupling rods, a locomotive boiler having fire tubes and return flue tubes connected to the engines by water jacketed pipes, the exhaust from one set of the oppositely disposed internal combustion engines discharging into the fire box of the boiler, while the exhaust from the opposite set of internal combustion engines discharges through the smoke box into the return flue tubes of the locomotive boiler and the steam from the boiler passes to the steam engines, and the water space of the water jacketed connecting pipes is in communication with both the water jackets of the engines and the water space of the boiler.

15. An internal combustion locomotive having a plurality of pairs of road wheels connected by common coupling rods and comprising a plurality of oppositely disposed horizontal combined internal combustion and steam engines having a common valve operating shaft geared to an intermediate crank shaft having crank pins operating directly in the road wheel coupling rods, and a locomotive boiler, the cylinders of the two adjacent outer pairs of the engines having their cranks at 180° apart while the two adjacent central pairs have their cranks at 90° apart and the relative position of the steam valve ports to the valves of the cylinders receiving steam from the boilers reversed so that the valves can be operated from the common valve operating shaft, the boiler receiving at opposite ends exhaust gases from the opposite sets respectively of internal combustion engines.

16. An internal combustion locomotive comprising a plurality of oppositely disposed horizontal internal combustion engines geared to an intermediate crank shaft, a plurality of pairs of road wheels having crank pins connected by common coupling rods, the engines being geared centrally to the intermediate shaft and the crank pins on the intermediate shaft operating directly in the coupling rods of the road wheels.

In witness whereof we affix our signatures.

OLIVER MARGETSON.
PERCY GRIERSON ROBINSON.